Nov. 19, 1974  W. S. MEFFERD  3,849,531

METHOD OF MAKING A CORED LASER TUBE

Original Filed Aug. 19, 1968

3,849,531
METHOD OF MAKING A CORED LASER TUBE
Wayne S. Mefferd, Palo Alto, Calif., assignor to Coherent Radiation Laboratories, Inc., Palo Alto, Calif.
Original application Aug. 19, 1968, Ser. No. 753,684, now Patent No. 3,619,810. Divided and this application July 23, 1970, Ser. No. 63,994
Int. Cl. B29c 17/07
U.S. Cl. 264—92        2 Claims

ABSTRACT OF THE DISCLOSURE

A method of making a cored laser tube in which the core is formed of a plurality of spaced-apart graphite blocks containing aligned central bores on the optical axis of a laser tube. The graphite blocks are keyed to the tube so that the blocks do not rotate, and the tube is shrunk fit onto the peripheries of the graphite blocks. Shrink fitting is accomplished by supporting the graphite blocks on a wire which is held under tension while a vacuum is drawn on the interior of the tube and the tube is heated to a temperature at which it flows.

BACKGROUND OF THE INVENTION

Figure 1:
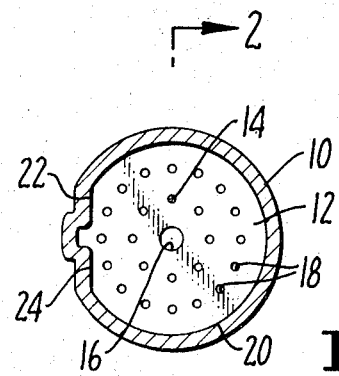

This application is a division of copending application Ser. No. 753,684, filed Aug. 19, 1968, now U.S. Pat. 3,619,810.

The use of graphite core blocks for the core of ion lasers is disclosed in an article written by K. G. Hernqvist and J. R. Fendley, Jr. in the "IEEE Journal of Quantum Electronics," February 1967. Various problems are encountered in physically supporting graphite blocks in the laser tube where it is desirable to have the blocks very accurately positioned on the optical axis of the tube and where it is desirable to employ a minimum number of parts inside the tube. I have found that the graphite core blocks may be mounted very precisely in the laser tube by a very inexpensive and efficient method by shrink fitting in the laser tube itself directly onto the peripheries of the graphite blocks. This may be accomplished by supporting the graphite blocks in their intended physical configuration inside the laser tube and heating the laser tube to a temperature at which the material from which the tube is made flows while applying a greater pressure to the exterior of the tube than the interior until the material of the tube flows into engagement with the graphite blocks.

The core structure formed in this way is symmetrical about the axis of the tube, and for this reason, one might expect that the graphite blocks could be mounted in such a way that it would be possible for them to rotate about the axis of the tube. We have discovered, however, that the graphite blocks should be directly keyed to the wall of the tube to prevent them from rotating since rotation of the core blocks may cause destruction of the tube itself.

Thus, where the core structure is made in accordance with the method of this invention by shrink fitting the tube onto the core blocks, the internal wall surfaces of the tube are positioned very close to the exterior surfaces of the graphite blocks. A small clearance is provided between these two surfaces because of the thermal expansion characteristics of the materials. The graphite blocks have a very high coefficient of thermal expansion which is higher than the coefficient expansion of the material used for formation of the tube. For this reason, the process of shrink fitting brings the internal surface of the tube and external surfaces of the graphite blocks into direct contact at the temperature at which shrink fitting takes place, that is, at a high enough temperature where the material from which the tube is formed becomes plastic. This temperature of shrink fitting is higher than the operating temperature of the parts during operation of the laser, and accordingly, the graphite blocks do not expand thermally during normal operation of the laser to the diameter which they occupied at the time the laser tube was shrunk fit onto them so that thermal expansion of the graphite blocks during operation of the laser does not damage the tube.

The graphite blocks must be prevented from rotating inside the tube so that thermal expansion of the blocks does not rupture the tube where the blocks contain any lack of symmetry. Thus, I have found that laser tubes have been broken where the end faces of the graphite blocks were non-parallel and were permitted to rotate in a shrunk fit laser tube.

Figure 2:
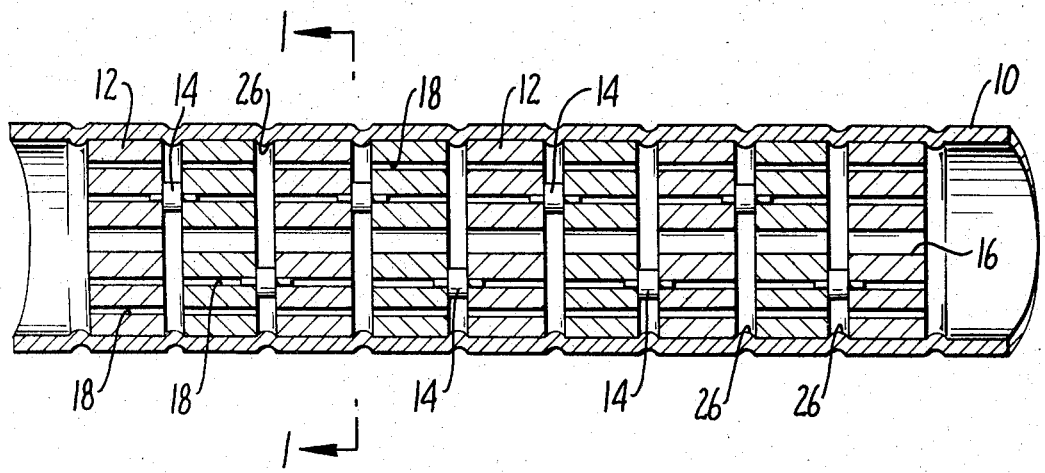

Other features and advantages of the invention will become apparent from the following description read in conjunction with the attached drawing in which:

FIG. 1 is a central cross-sectional view through a laser tube constructed in accordance with this invention; and FIG. 2 is a longitudinal sectional view of the laser of FIG. 1 taken along the plane indicated at 2—2 in FIG. 1.

DETAILED DESCRIPTION

Referring now in detail to the drawings, the laser tube illustrated therein comprises an outer tube 10 formed of a thermoplastic ceramic material such as fused quartz containing a plurality of graphite blocks 12 separated by dielectric ceramic spacers 14. The graphite blocks contain aligned central bores 16 through which the gas discharge of the tube passes and a plurality of radially spaced gas passageways 18 through which the gas medium in the laser tube may flow from one end of the tube to the other to relieve the effect of ion pumping. The spacers 14 are formed as thin ceramic discs containing protruding ceramic nipples that fit into certain of the gas passageways 18 to hold the spacers in place.

As illustrate din FIG. 1, each of the ceramic blocks 12 has a cylindrical circumferential surface 20 which extends around approximately 330° of the circumference of the blocks 12. In the remaining 30° of the circumference of the blocks 12, the blocks are cut away in two axially extending areas 22 and 24 to define a key portion of the blocks. As explained in greater detail hereinafter, the tube 10 is shrunk fit onto the blocks 12 so that the interior surfaces of the tube 10 embrace the circumferential portion 20 and key portion 22–24 of the blocks, and the tube 10 extends radially into the space between blocks as illustrated at 26 so that the blocks are supported by the tube both against axial and circumferential movement.

In accordance with the method of this invention, the graphite blocks are physically supported in an independent position inside the tube and physically supported independently of the tube while the tube is heated to a temperature at which the material of the tube flows and while the greater pressure is applied to the exterior of the tube than to the interior. The physical support for the graphite blocks is preferably provided by mounting the blocks on a metal wire which will retain its structural strength at the temperature of shrink fitting, preferably a wire made of tungsten. The tungsten wire is maintained under tension during the period when the tube is heated to its flow temperature. The application of pressure differential to the wall of the tube is preferably accomplished by evacuating the tube while the periphery of the tube adjacent to the graphite blocks is heated.

The method of making the laser core structure in accordance with this invention may be performed on a glass lathe with tubes supported at both of its ends for rotation in the lathe while the graphite blocks are supported on a tungsten wire maintained under tension in the tube. One end of the tube may be sealed and a vacuum pump connected to the other end, and the tube is rotated in the lathe while heat is applied to the exterior of the tube first near one end of the group of graphite blocks and progressing slowly to the other end of the group. The heating is performed sufficiently intently and slowly that the temperature of the graphite blocks is raised to an equilibrium temperature above their operating temperature during normal operation of the laser in which they are to be used.

While one specific embodiment of the invention has been illustrated and described in detail herein, it is obvious that many modifications thereof may be made without departing from the spirit and scope of the invention.

I claim:

1. The method of making a core structure surrounding the optical axis of an ion laser where said core structure is made of a plurality of graphite blocks having central bores extending along said axis which comprises:
    A. Providing a key portion on the periphery of each of said blocks with said key portions extending less than 360° around the periphery of said block;
    B. Supporting said blocks spaced apart from each other inside a tube of thermoplastic ceramic material having a lower coefficient of thermal expansion than said blocks with the central bores in said blocks aligned with each other and with said blocks supported independently of said tube;
    C. Heating said blocks and said tube in the area surrounding said blocks to a high temperature, which is above the normal operating temperature of the laser parts, at which the thermoplastic material of said tube will flow while applying a greater pressure to the exterior of said tube than to the interior of said tube until the material of said tube flows into engagement with the circumference of said blocks and said key portions of said blocks; and
    D. Cooling said tube to a temperature below the temperature at which the material of said tube flows.

2. The method of Claim 1 characterized further in that:
    A. said step of supporting said blocks is performed by mounting said blocks on a wire with said wire extending through said central bores of said blocks and with said wire formed of a material having substantial strength at said high temperature and applying tension to said wire; and
    B. said step applying a greater pressure to the exterior of said tube than to the interior of said tube is performed by evacuating said tube.

References Cited

UNITED STATES PATENTS

| | | | |
|---|---|---|---|
| 3,501,714 | 3/1970 | Myers et al. | |
| 2,457,218 | 12/1948 | Farrell | 65—108 |
| 2,965,698 | 12/1960 | Gottschalk | 65—59 X |
| 3,376,642 | 4/1968 | Liska | 425—110 X |
| 2,983,958 | 5/1961 | Fay | 264—278 X |
| 3,210,145 | 10/1965 | Fyler | 65—155 |
| 3,581,364 | 6/1971 | Wyse | 264—277 |
| 3,242,253 | 3/1966 | Bailey et al. | 65—59 X |

ROBERT F. WHITE, Primary Examiner

W. E. HOAG, Assistant Examiner

U.S. Cl. X.R.

29—447; 65—110; 264—249, 322